United States Patent Office 2,838,517
Patented June 10, 1958

2,838,517

PROCESS FOR THE MANUFACTURE OF QUINUCLIDINE CARBOXYLIC ACID

Cyril A. Grob and Ernst Renk, Basel, Switzerland, assignors to Ciba Pharmaceutical Products, Inc., Summit, N. J.

No Drawing. Application November 23, 1955
Serial No. 548,783

Claims priority, application Switzerland
November 30, 1954

6 Claims. (Cl. 260—294)

This invention relates to a new process for the manufacture of quinuclidine-2-carboxylic acid and the salts thereof. Salts are especially those with inorganic and organic acids.

Quinuclidine-2-carboxylic acid is known and was first described by V. Prelog and E. Cerkovnikov in Liebigs Annalen, 532, 83 (1937). The method used for its preparation is however very complicated and does not result in a satisfactory yield.

Quinuclidine-2-carboxylic acid serves as intermediate for the manufacture of therapeutically useful compounds. For example, its esters show pronounced sympathomimetic properties. They may be used in motor or secretory disturbances of the gastro-intestinal tract.

The new process for the manufacture of quinuclidine-2-carboxylic acid is characterized by heating a 2-halogen-3-(4'-piperidyl)-propionic acid or a salt thereof in the presence of an acid-binding-agent and, if desired, converting the resulting salts into the free compound and, if desired, converting the free compound into its salts. As an acid-binding agent there may be used, for example, oxides, hydroxides or carbonates of metals of the first and second groups of the periodic system e. g. oxides, hydroxides or carbonates of alkali and earth-alkaline metals, especially sodium and potassium hydroxide, as well as metal alcoholates such as sodium alcoholate, for instance sodium ethylate. It is also possible to carry out the reaction in the presence of an organic base such as pyridine or collidine. The condensation can be performed in the presence or absence of a solvent. It is an advantage if the operation takes place at a raised temperature, preferably below 200° C., best of all between about 70 and 120° C.

The resulting products of the process can be obtained in a free state or as salts. From the free compound salts can be prepared with an acid or a metal. Salts with acids are especially those with inorganic acids, such as hydrohalic acids, sulfuric acid, nitric acid, phosphoric acids, or organic acids such as acetic acid. Salts with metals are especially those with metals of the first and second groups of the periodic system, such as with sodium or potassium.

The starting materials are known or can be prepared by methods in themselves known.

The following example illustrates the invention.

*Example*

0.9 gram of the hydrochloride of 2-chloro-3-(4'-piperidyl)-propionic acid is boiled with 8 cc. of 1 N sodium hydroxide solution for 2 hours under reflux. Already after about 30 minutes the solution shows no further alkaline reaction to phenolphthalein. The cooled solution is rendered acid to Congo with hydrochloric acid and evaporated under reduced pressure. The residue is extracted exhaustively with absolute ethanol. On evaporation 0.63 grams of colorless crystals separate gradually. The latter can be obtained in quite pure form by recrystallization from ethanol. They melt at 290–291° C. with decomposition and are the hydrochloride of quinuclidine-2-carboxylic acid.

The free quinuclidine-2-carboxylic acid is obtained according to the usual methods, for example by treatment with silver oxide. It melts at 275–278° C. with decomposition.

The hydrobromide can be recrystallized from ethanol and melts at 277–278° C. with decomposition.

The hydrochloride of 2-chloro-3-(4-piperidyl)-propionic acid used as starting material can be obtained in the following manner:

40 grams of 2-chloro-3-(1'-benzoyl-4'-piperidyl)-propionic acid (cf. Harris and Work, Biochem. J. 46, 190 (1950)) are boiled with 250 cc. of concentrated hydrochloric acid, and 200 cc. of water under reflux. The cooled mixture is extracted with chloroform, and from the aqueous solution there is obtained on evaporation under reduced pressure and grinding with acetone the hydrochloride which can be purified by recrystallization from mixture of methanol and acetone. It melts at 177–183° C. The pharmacologically important esters are obtained for example in the following manner:

0.3 gram of quinuclidine-2-carboxylic acid hydrochloride is boiled with 4 cc. of thionyl chloride for 1½ hours under reflux. After evaporating in vacuo, 10 cc. of absolute methanol are added to the crystalline residue, the mixture is boiled and evaporated in vacuo again. On recrystallization from ethanol there is obtained 2-carbomethoxy-quinuclidine-hydrochloride in the form of colorless crystals. This hydrochloride as well as the free base which can be obtained in the usual manner and recrystallized from pentane, show pronounced sympathomimetic properties.

If absolute ethanol or N-butanol are used instead of methanol, there is obtained in an analogous manner 2-carbethoxy- or 2-carbo-n-butoxy-quinuclidine-hydrochloride which can be converted into the free bases in the ordinary manner. The esters described may be used as medicament in motor or secretory disturbances of the gastro-intestinal tract.

What is claimed is:

1. A process for the preparation of a member of the group consisting of quinuclidine-2-carboxylic acid and salts thereof, which comprises the step of heating a member selected from the group consisting of 2-halo-3-(4'-piperidyl)-propionic acid and acid addition salts thereof in the presence of an acid-binding agent.

2. A process as set forth in claim 1 wherein the acid-binding agent is a member selected from the group consisting of alkali and alkaline-earth metal oxides, hydroxides, carbonates and alcoholates.

3. In a process for the preparation of quinuclidine-2-carboxylic acid, the step which comprises heating the hydrochloride of 2-chloro-3-(4'-piperidyl)-propionic acid in the presence of sodium hydroxide.

4. In a process for the preparation of quinuclidine-2-carboxylic acid, the step which comprises heating the hydrochloride of 2-chloro-3-(4'-piperidyl)-propionic acid in the presence of sodium hydroxide, and treating the resulting hydrochloride of quinuclidine-2-carboxylic acid with silver oxide.

5. In a process for the preparation of quinuclidine-2-carboxylic acid, the step which comprises heating the hydrobromide of 2-chloro-3-(4'-piperidyl)-propionic acid in the presence of sodium hydroxide.

6. In a process for the preparation of quinuclidine-2-carboxylic acid, the step which comprises heating the hydrobromide of 2-chloro-3-(4'-piperidyl)-propionic acid in the presence of sodium hydroxide, and treating the resulting hydrobromide of quinuclidine-2-carboxylic acid with silver oxide.

References Cited in the file of this patent

Simons: Industrial and Engineering Chemistry, vol. 39, p. 238 (1947).

Rubtsov et al.: Chemical Abstracts, vol. 48, cols. 3975 and 7610.